US012604257B2

(12) United States Patent
   Xiao et al.

(10) Patent No.: US 12,604,257 B2
(45) Date of Patent: Apr. 14, 2026

(54) METHODS, DEVICES, AND SYSTEMS FOR DETERMINING SYNC RASTER

(71) Applicant: ZTE Corporation, Shenzhen (CN)

(72) Inventors: Kai Xiao, Shenzhen (CN); Xing Liu, Shenzhen (CN); Peng Hao, Shenzhen (CN); Jing Shi, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 329 days.

(21) Appl. No.: 18/533,380

(22) Filed: Dec. 8, 2023

(65) Prior Publication Data

US 2024/0114437 A1     Apr. 4, 2024

Related U.S. Application Data

(63) Continuation of application No. PCT/CN2021/117365, filed on Sep. 9, 2021.

(51) Int. Cl.
   *H04L 5/00*        (2006.01)
   *H04W 28/20*       (2009.01)
   *H04W 48/10*       (2009.01)
   *H04W 72/0453*     (2023.01)

(52) U.S. Cl.
   CPC ........... *H04W 48/10* (2013.01); *H04L 5/0048* (2013.01); *H04W 28/20* (2013.01); *H04W 72/0453* (2013.01)

(58) Field of Classification Search
   None
   See application file for complete search history.

(56) References Cited

U.S. PATENT DOCUMENTS

| | | |
|---|---|---|
| 2007/0268862 A1 | 11/2007 | Singh et al. |
| 2018/0063841 A1 | 3/2018 | Song et al. |
| 2020/0099493 A1 | 3/2020 | Ko et al. |
| 2021/0084576 A1 | 3/2021 | Zhu et al. |

(Continued)

FOREIGN PATENT DOCUMENTS

| | | |
|---|---|---|
| CN | 108702752 A | 10/2018 |
| CN | 110178440 A | 8/2019 |

(Continued)

OTHER PUBLICATIONS

3GPP TS 38.101-1 V17.2.0 (Jun. 2021).*

(Continued)

*Primary Examiner* — Abdelillah Elmejjarmi
(74) *Attorney, Agent, or Firm* — Crowell & Moring LLP

(57) ABSTRACT

The present disclosure describes methods, systems and devices for determining sync raster. One method includes determining, by a user equipment (UE), a sync raster (SR) with a base station, wherein a first bandwidth of a synchronization signal or physical broadcast channel (SS/PBCH) block is larger than or equal to a minimum bandwidth in a narrowband, by: determining a frequency point of the SR; scanning the frequency point to obtain a scan result; and connecting with the base station based on the scan result. Another method includes determining a SR with a base station, wherein a first bandwidth of a SS/PBCH block is smaller than or equal to a minimum bandwidth in a narrowband, by: determining a frequency point of the SR; scanning the frequency point to obtain a scan result; and connecting with the base station based on the scan result.

11 Claims, 11 Drawing Sheets

(56)             References Cited

U.S. PATENT DOCUMENTS

| | | | |
|---|---|---|---|
| 2021/0168701 A1 | 6/2021 | Wu et al. | |
| 2021/0345312 A1 | 11/2021 | Xie | |
| 2022/0191810 A1* | 6/2022 | Tang | H04L 27/2607 |
| 2023/0396481 A1* | 12/2023 | Park | H04L 27/2613 |

FOREIGN PATENT DOCUMENTS

| | | | |
|---|---|---|---|
| CN | 110351740 A | 10/2019 |
| CN | 111092701 A | 5/2020 |
| CN | 111356237 A | 6/2020 |
| CN | 112655180 A | 4/2021 |
| KR | 20180122925 A | 11/2018 |
| WO | WO 2021034056 A1 | 2/2021 |

OTHER PUBLICATIONS

Extended European Search Report regarding EP 21 95 6359 dated Jun. 3, 2024, 12 pages.

Zte et al. Discussion on spectrum less than 5MHz in Rel-18 11, 3GPP Draft, RP-212387, 3rd Generation Partnership Project (3GPP), Mobile Competence Centre, 650, Route des Lucioles, F-06921 Sophia-Antipolis Cedex, France, vol. TSG RAN, no. e-Meeting, Sep. 13, 2021-Sep. 17, 2021, Sep. 6, 2021, XP052050363, 4 pages. Retrieved from the Internet: https://ftp.39pp.org/tsg_ran/TSG_RAN/ TSGR_93e/Docs/RP-212387.zipRP212387Discussion on spectrum less than 5MHz inRel-18.docx.

Non-final Office Action mailed Nov. 25, 2025 in U.S. Appl. No. 18/533,472.

International Search Report and Written Opinion regarding PCT/ CN2021/117365 dated May 25, 2022, 8 pages.

International Search Report and Written Opinion regarding PCT/ CN2021/117364 dated May 25, 2022, 8 pages.

Extended European Search Report regarding EP 21 95 6358 dated Jul. 15, 2024, 12 pages.

Dahlman Erik et al., "5G NR The Next Generation Wireless Access Technology, 2nd Edition, Chapters 1-17," In: "5G NR", Sep. 18, 2020 (Sep. 18, 2020), Elsevier, XP055908004, ISBN: 978-0-12-822320-8, pp. 1-611.

Ericsson, "Coexistence of LTE-MTC with NR," 3GPP DRAFT, R1-1903885, Coexistence of LTE-MTC With NR, 3rd Generation Partnership Project (3GPP), Mobile Competence Centre, 650, Route des Lucioles, F-06921 Sophia-Antipolis Cedex, France, vol. RAN WG1, no. Xi'an, China; Apr. 8, 2019-Apr. 12, 2019 29 Mar. 29, 2019, XP051691130, 17 pages, Retrieved from the Internet: www. 39pp.org/ftp/tsg%5Fran/WG1 %5FRL 1 /TSGR1%5F96b/Docs/R1% 2D1903885%2Ezip.

* cited by examiner

400 determining, by a user equipment (UE), a sync raster (SR) with a base station, wherein a first bandwidth of a synchronization signal or physical broadcast channel (SS/PBCH) block is larger than or equal to a minimum bandwidth in a narrowband, by: determining, by the UE, a frequency point of the SR;          410 scanning, by the UE, the frequency point to obtain a scan result          420 connecting, by the UE, with the base station based on the scan result          430

FIG. 4A

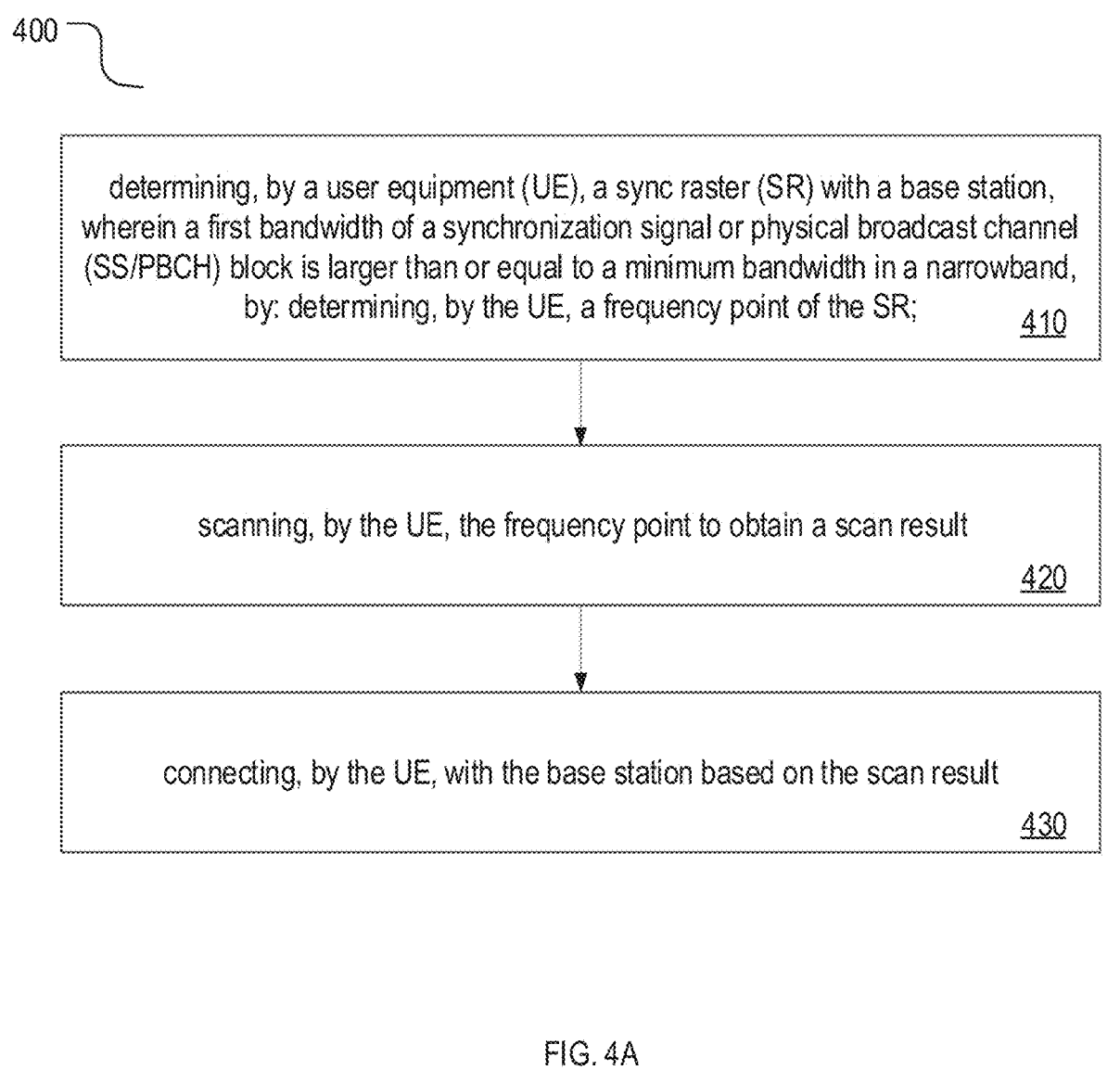

500 determining, by a user equipment (UE), a syn raster (SR) with a base station, wherein a first bandwidth of a SS/PBCH block is smaller than or equal to a minimum bandwidth in a narrowband, by: determining, by the UE, a frequency point of the SR;

510 scanning, by the UE, the frequency point to obtain a scan result

520 connecting, by the UE, with the base station based on the scan result

| Frequency range | Frequency position |
|---|---|
| 0 – 1000 MHz | $N * b$ kHz + M * $c$ kHz, <br><br> N=1:$n$ M $\epsilon$ {1,3,...,2$m$-1} m>4 |

FIG. 6A

| Frequency range | Frequency position |
|---|---|
| 0 – 1000 MHz | N * 1200kHz + M * 50 kHz, <br><br> N=1:$n$ M $\epsilon$ {1,3,5,7,9} |

FIG. 6B

| Frequency range | Frequency position |
|---|---|
| 0 – 1000 MHz | N * $b$ kHz + M * $c$ kHz,<br>N=1:$n$ M ∈ {1,5,...,4m-3} m>2 |

FIG. 7A

| Frequency range | Frequency position |
|---|---|
| 0 – 1000 MHz | N * 1200kHz + M * 50 kHz,<br>N=1:$n$ M ∈ {1,5,9} |

FIG. 7B

| Frequency range | Frequency position |
|---|---|
| 0 – 1000 MHz | $N * b$ kHz $+ M * c - f$ kHz,<br>$N=1{:}n$ $M \in \{1,3,..,2m\text{-}1\}$ $m>2$ |

FIG. 8A

| Frequency range | Frequency position |
|---|---|
| 0 – 1000 MHz | $N * 1200$kHz $+ M * 100$ kHz $-50$kHz,<br>$N=1{:}n$ $M \in \{1,3,5\}$ |

FIG. 8B

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 12 | 4 | 0 |
| 1 | 1 | 12 | 4 | 1 |
| 2 | 1 | 12 | 5 | 0 |
| 3 | 1 | 12 | 5 | 1 |
| 4 | 1 | 16 | 3 | 0 |
| 5 | 1 | 16 | 3 | 1 |
| 6 | 1 | 16 | 3 | 3 |
| 7 | 1 | 16 | 3 | 5 |
| 8 | 1 | 16 | 4 | 0 |
| 9 | 1 | 16 | 4 | 1 |
| 10 | 1 | 16 | 4 | 3 |
| 11 | 1 | 16 | 4 | 5 |
| 12 | Reserved | | | |
| 13 | | | | |
| 14 | | | | |
| 15 | | | | |

FIG. 9A

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 12 | 4 | 0 |
| 1 | 1 | 12 | 5 | 0 |
| 2 | 1 | 16 | 3 | 0 |
| 3 | 1 | 16 | 3 | 2 |
| 4 | 1 | 16 | 3 | 4 |
| 5 | 1 | 16 | 4 | 0 |
| 6 | 1 | 16 | 4 | 2 |
| 7 | 1 | 16 | 4 | 4 |

FIG. 9B

| Index | SS/PBCH block and CORESET multiplexing pattern | Number of RBs $N_{RB}^{CORESET}$ | Number of Symbols $N_{symb}^{CORESET}$ | Offset (RBs) |
|---|---|---|---|---|
| 0 | 1 | 16 | 3 | 0 |
| 1 | 1 | 16 | 4 | 0 |

FIG. 9C

METHODS, DEVICES, AND SYSTEMS FOR DETERMINING SYNC RASTER

CROSS-REFERENCE TO RELATED APPLICATION

This application is a continuation application of PCT International Patent Application No. PCT/CN2021/117365, filed with the China National Intellectual Property Administration, PRC on Sep. 9, 2021, which is herein incorporated by reference in its entirety.

TECHNICAL FIELD

The present disclosure is directed generally to wireless communications. Particularly, the present disclosure relates to methods, devices, and systems for determining sync raster.

BACKGROUND

Wireless communication technologies are moving the world toward an increasingly connected and networked society. High-speed and low-latency wireless communications rely on efficient network resource management and allocation between user equipment and wireless access network nodes (including but not limited to base stations). A new generation network is expected to provide high speed, low latency and ultra-reliable communication capabilities and fulfill the requirements from different industries and users.

With the rapid evolution of cellular mobile communication systems, more and more cells will be operated at higher frequencies. For the 5th Generation mobile communication technology, the supported minimum bandwidth may be 5 MHz in normal circumstances. In some special scenarios, such as Railway, the available frequency domain resources of some operators may be less than 5 MHz. For example, when the defined minimum bandwidth is less than 3.6 MHz, the original synchronization signal (SS) or physical broadcast channel (PBCH) block may exceed the minimum bandwidth; and the one or more resource block (RB) of SS/PBCH block that exceeds the minimum bandwidth may be punctured, resulting in performance degradation or failure to work. SSB block may include a primary synchronization signal (PSS) block and/or a secondary synchronization signal (SSS) block.

The present disclosure may address at least one of issues/problems associated with the existing system and describes various embodiments, thus improving the performance of the wireless communication.

SUMMARY

This document relates to methods, systems, and devices for wireless communication and more specifically, for determining sync raster.

In one embodiment, the present disclosure describes a method for wireless communication. The method includes determining, by a user equipment (UE), a sync raster (SR) with a base station, wherein a first bandwidth of a synchronization signal or physical broadcast channel (SS/PBCH) block is larger than or equal to a minimum bandwidth in a narrowband, by: determining, by the UE, a frequency point of the SR; scanning, by the UE, the frequency point to obtain a scan result; and connecting, by the UE, with the base station based on the scan result.

In another embodiment, the present disclosure describes a method for wireless communication. The method includes determining, by a user equipment (UE), a sync raster (SR) with a base station, wherein a first bandwidth of a SS/PBCH block is smaller than or equal to a minimum bandwidth in a narrowband, by: determining, by the UE, a frequency point of the SR; scanning, by the UE, the frequency point to obtain a scan result; and connecting, by the UE, with the base station based on the scan result.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 4A shows a flow diagram of a method for wireless communication.

FIG. 5 shows a flow diagram of another method for wireless communication.

FIG. 6A shows an example of an exemplary embodiment for wireless communication.

FIG. 6B shows an example of an exemplary embodiment for wireless communication.

FIG. 7A shows an example of an exemplary embodiment for wireless communication.

FIG. 7B shows an example of an exemplary embodiment for wireless communication.

FIG. 8A shows an example of an exemplary embodiment for wireless communication.

FIG. 8B shows an example of an exemplary embodiment for wireless communication.

FIG. 9A shows an example of an exemplary embodiment for wireless communication.

FIG. 9B shows an example of an exemplary embodiment for wireless communication.

FIG. 9C shows an example of an exemplary embodiment for wireless communication.

DETAILED DESCRIPTION

Figure 1:
FIG. 1 shows an example of a wireless communication system include one wireless network node and one or more user equipment.
Figure 1:
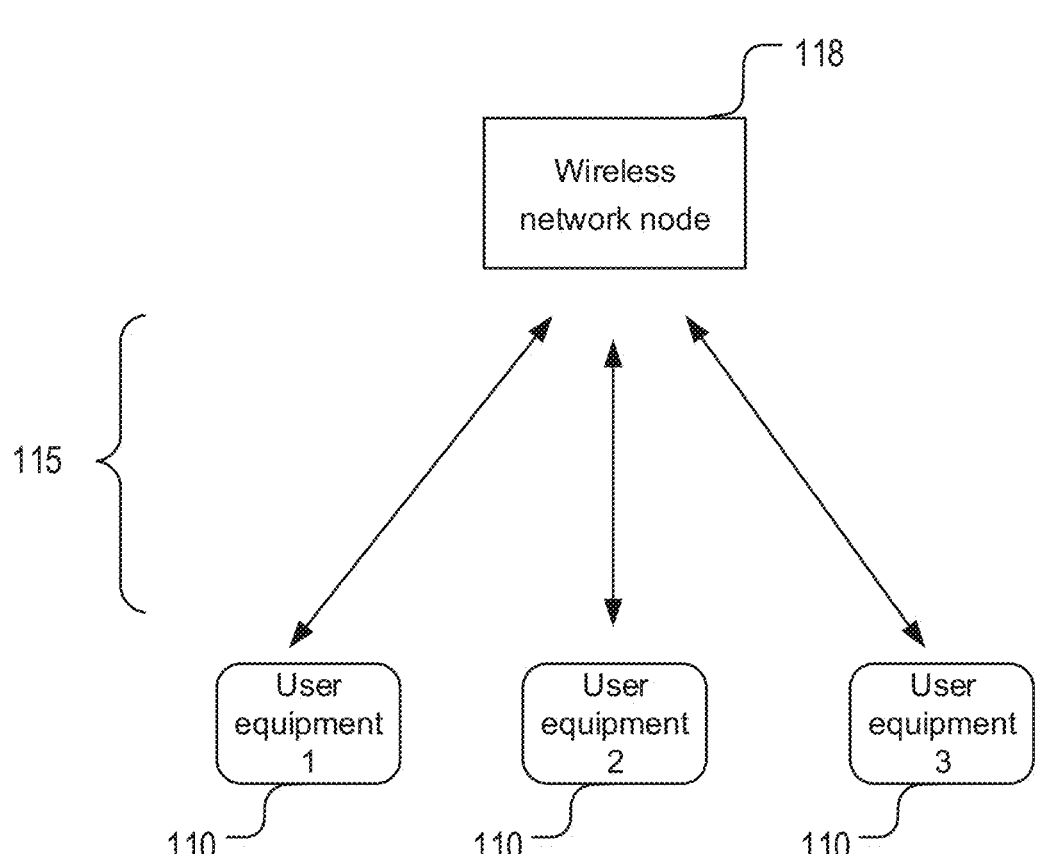

The present disclosure will now be described in detail hereinafter with reference to the accompanied drawings, which form a part of the present disclosure, and which show, by way of illustration, specific examples of embodiments.

Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for determining sync raster.

New generation (NG) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users.

With the rapid evolution of cellular mobile communication systems, more and more cells will be operated at higher frequencies. For the 5th Generation mobile communication technology, the supported minimum bandwidth may be 5 MHz in normal circumstances. In some special scenarios, such as Railway, the available frequency domain resources of some operators may be less than 5 MHz. For example, when the defined minimum bandwidth is less than 3.6 MHz, the original synchronization signal (SS) or physical broadcast channel (PBCH) block may exceed the minimum bandwidth; and the one or more resource block (RB) of SS/PBCH block that exceeds the minimum bandwidth may be punctured, resulting in performance degradation or failure to work. SSB block may include a primary synchronization signal (PSS) block and/or a secondary synchronization signal (SSS) block.

The present disclosure describes various embodiment for determining sync raster, which may address at least one of issues/problems associated with the existing system and describes various embodiments, thus improving the performance of the wireless communication. In various embodiments, the sync raster (SR) may include synchronization signal raster (SSR).

In various embodiments, to minimize the impact on performance, a single or a combination of the following methods may be used. In one method, a number of RBs punctured may be configured to be as small as possible. In another method, a new SS/PBCH block structure may be designed.

In various embodiments, no matter which one of the above methods is selected, the SR may need to be redefined to apply to smaller bandwidths.

In some embodiments, a control resource set for Type0 (CORESET0) Physical Downlink Control Channel (PDCCH) Common Search Space (CSS) may occupy the frequency domain resource with at least 24 RBs, while the frequency domain bandwidth of 3.6 MHz at most contains 20 RBs.

FIG. 1 shows a wireless communication system 100 including a wireless network node 118 and one or more user equipment (UE) 110. The wireless network node may include a network base station, which may be a nodeB (NB, e.g., a gNB) in a mobile telecommunications context. Each of the UE may wirelessly communicate with the wireless network node via one or more radio channels 115. For example, a first UE 110 may wirelessly communicate with a wireless network node 118 via a channel including a plurality of radio channels during a certain period of time. The network base station 118 may send high layer signalling to the UE 110. The high layer signalling may include configuration information for communication between the UE and the base station. In one implementation, the high layer signalling may include a radio resource control (RRC) message.

Figure 2:
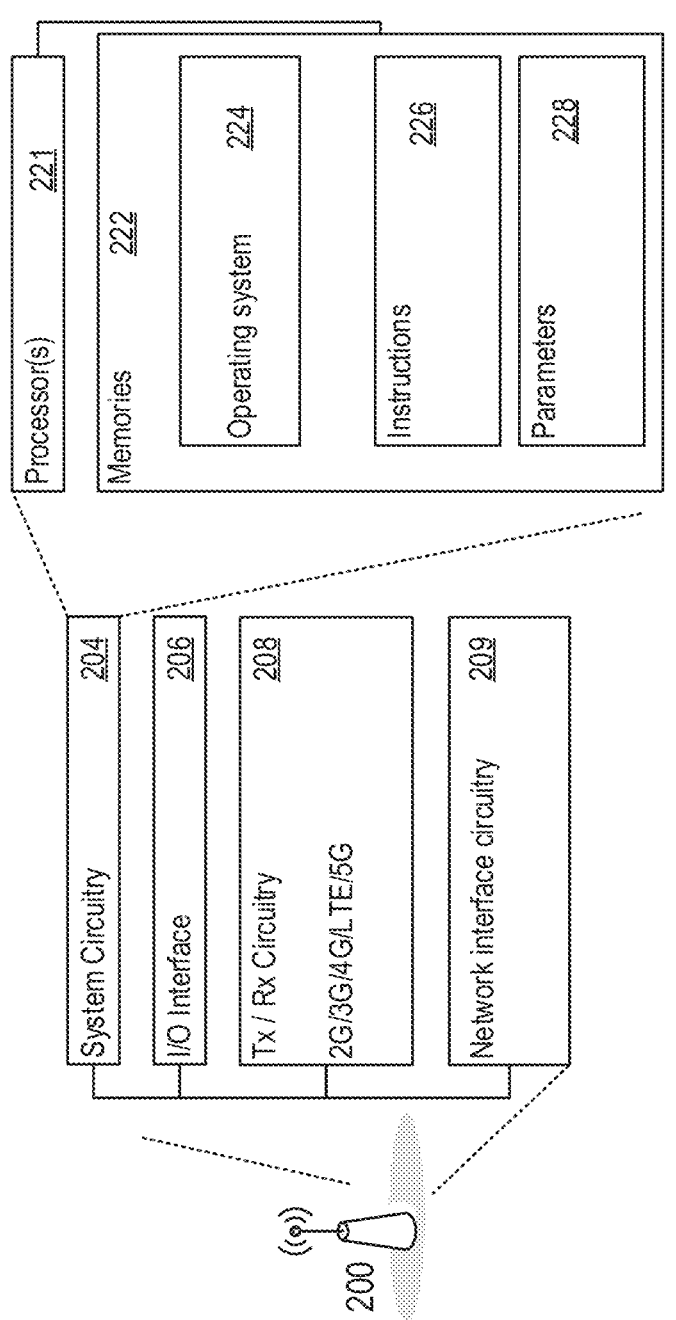
FIG. 2 shows an example of a network node.

FIG. 2 shows an example of electronic device 200 to implement a network base station. The example electronic device 200 may include radio transmitting/receiving (Tx/Rx) circuitry 208 to transmit/receive communication with UEs and/or other base stations. The electronic device 200 may also include network interface circuitry 209 to communicate the base station with other base stations and/or a core network, e.g., optical or wireline interconnects, Ethernet, and/or other data transmission mediums/protocols. The electronic device 200 may optionally include an input/output (I/O) interface 206 to communicate with an operator or the like.

The electronic device 200 may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the network node. The parameters 228 may include parameters to support execution of the instructions 226. For example, parameters may include network protocol settings, bandwidth parameters, radio frequency mapping assignments, and/or other parameters.

Figure 3:
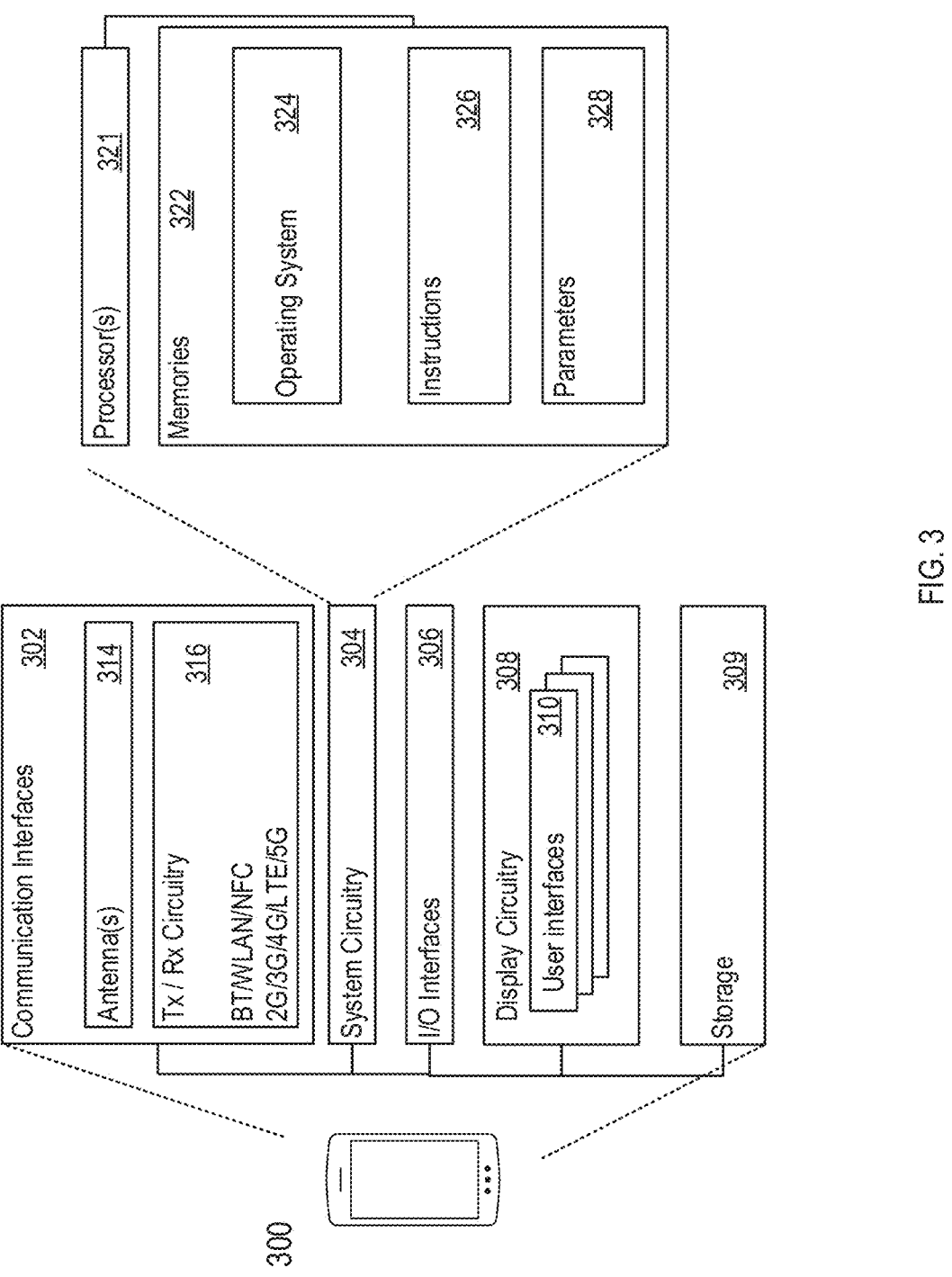
FIG. 3 shows an example of a user equipment.

FIG. 3 shows an example of an electronic device to implement a terminal device 300 (for example, user equipment (UE)). The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data; establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, preamplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several below embodiments, which may be implemented, partly or totally, on the network base station and/or the user equipment described above in FIGS. 2-3.

In various embodiments in the current 5G system, the minimum bandwidth supported may be 5 MHz, and the frequency points may be limited to a range of from 0 to 3000 MHz, inclusive. The sync raster (SR) may be evenly distributed within the range of from 0 to 3000 MHz, for example with 3 in each group. The interval between the SRs in the group may be 100 kHz. During the initial access, a UE may attempt to receive the SS/PBCH block at the frequency point corresponding to the SR.

Figure 4B:
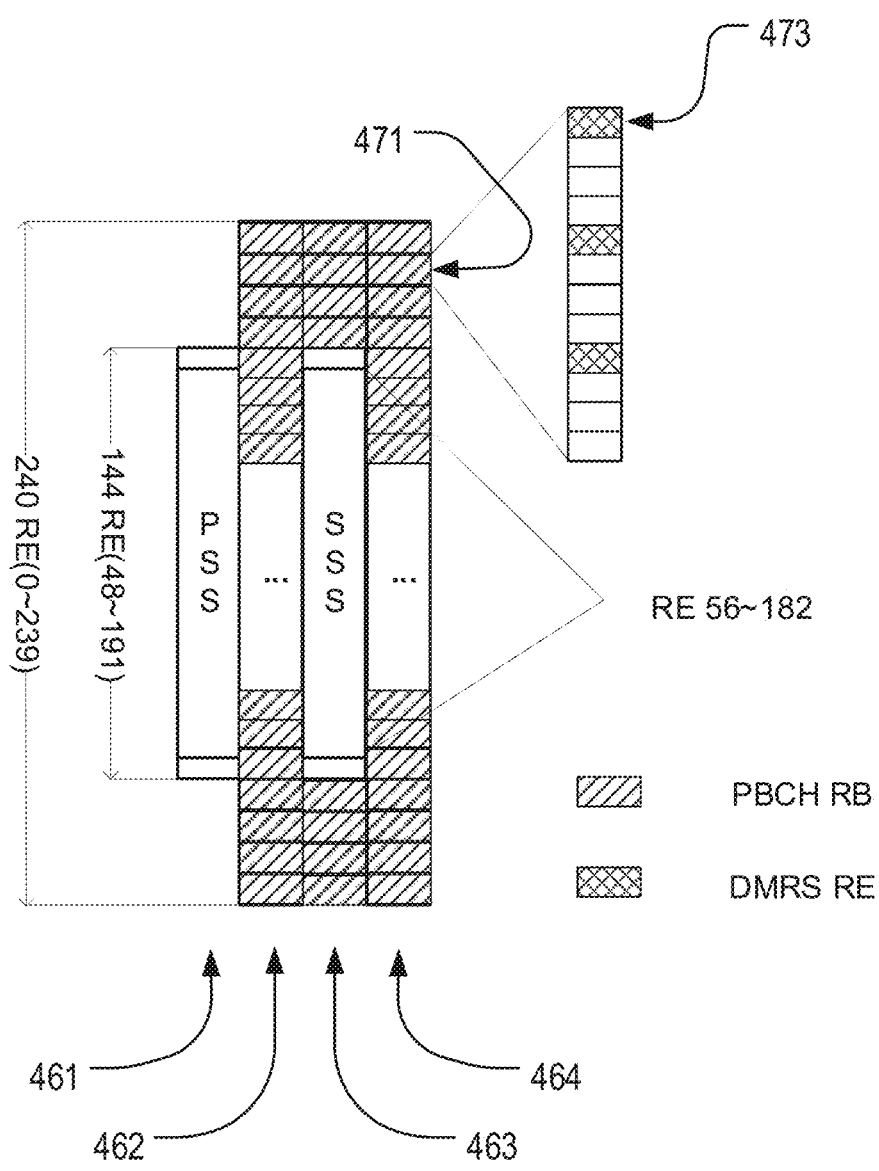
FIG. 4B shows a schematic diagram of an exemplary embodiment for wireless communication.

FIG. 4B shows an example of a current SS/PBCH block. The SS/PBCH block occupies 20 RBs in the frequency domain and 4 consecutive time domain symbols. The first symbol (461) is mapped to a primary synchronization signal (PSS), the third symbol (463) is mapped to a secondary synchronization signal (SSS) and a physical broadcast channel (PBCH), and the second symbol (462) and the fourth symbol (464) are mapped to PBCH. Each RB (471) of PBCH may include 3 demodulation reference signal (DMRS) resource elements (REs) (473) for channel estimation. In some implementations, CORESET0 occupies the frequency domain resource at least 24 RBs.

Referring to FIG. 4A, the present disclosure describes various embodiments of a method 400 for determining sync raster in wireless communication, and the method includes determining, by a user equipment (UE), a sync raster (SR) with a base station, wherein a first bandwidth of a synchronization signal or physical broadcast channel (SS/PBCH) block is larger than or equal to a minimum bandwidth in a narrowband. The method 400 may include a portion or all of the following steps: step 410: determining, by the UE, a frequency point of the SR; step 420: scanning, by the UE, the frequency point to obtain a scan result; and/or step 430: connecting, by the UE, with the base station based on the scan result.

In some implementations, in response to a first number of resource block (RB) being smaller than or equal to a first threshold, the SS/PBCH block is configured at a first frequency; and the first number of RB is $\lceil RB^{SS/PBCHblock} - RB^{BWP_{min}} \rceil$ wherein: $RB^{SS/PBCHblock}$ is a number of RBs that the SS/PBCH block occupies in a frequency domain, $RB^{BWP_{min}}$ is a number of RBs among the minimum bandwidth in the narrowband, and $\lceil \ \rceil$ represents a ceiling function.

In some other implementations, in response to at least one RB in the SS/PBCH block exceeding the minimum bandwidth, the UE stops receiving signals from the base station on the at least one RB, or the base station avoid sending signals of the SS/PBCH block in the at least one RB to the UE.

In various embodiments, a method may determine the frequency point of the SR referenced by UE for blindly detecting SS/PBCH blocks in a narrowband scenario where the frequency band is less than 5 MHz. A table in which the frequency positions of the SR may be which may be predefined. In the narrowband scenario, a UE may scan the frequency position with a larger area covered by the SR group according to the table.

In some embodiments, in a narrowband scenario, the minimum bandwidth supported may less than 5 MHz and the frequency point may not exceed 3 GHz. For example, in a narrowband scenario, 3.6 MHz or/and 3 MHz is supported in the 0~1 GHz frequency range. Before connecting the network side, the UE may search for SS/PBCH blocks according to the frequency point of the SR defined by the specification. For the UE that supports the narrowband scenario, the basic scanning and extended scanning should be performed in different frequency bands within 0~3 GHz. Or in other implementations, the UE supporting the narrowband scenario may perform extended scanning only in special frequency range, for example, extended scanning only in 0~1 GHz.

In various embodiments, the SS/PBCH block bandwidth may not be smaller than the minimum bandwidth in the narrowband scenario. The SS/PBCH block occupied RBs in frequency domain may be $RB^{SS/PBCHblock}$, and the maximum number of available RB resources among the minimum bandwidth may be $RB^{BWP_{min}}$. When the RB in SS/PBCH block frequency domain exceeds the minimum bandwidth, the UE may stop receiving signals from the gNB on these RBs, or the gNB may not send signals in the RBs that exceeds the minimum bandwidth to a UE. The UE may determine the first frequency position through blind detection. When a SS/PBCH block is placed at the first frequency, the number of RB that exceeds the minimum bandwidth may be smaller than or equal to the first threshold, such as $\lceil RB^{SS/PBCHblock} - RB^{BWP_{min}} \rceil$.

Figure 5:
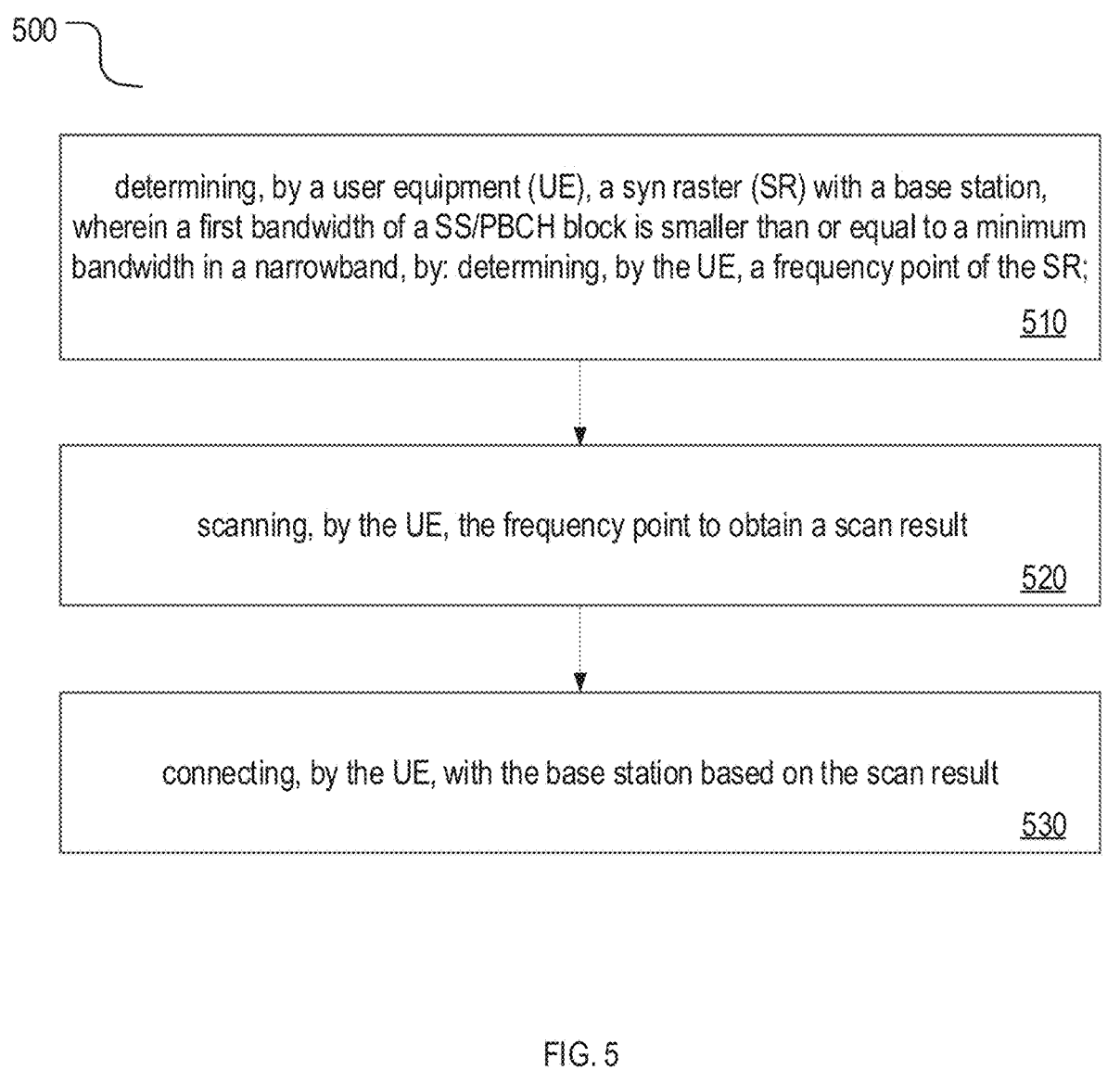

Referring to FIG. 5, the present disclosure describes various embodiments of a method 500 for determining sync raster (SR) in wireless communication, and the method includes determining, by a user equipment (UE), a sync raster with a base station, wherein a first bandwidth of a SS/PBCH block is smaller than or equal to a minimum bandwidth in a narrowband. The method 500 may include a portion or all of the following steps: step 510: determining, by the UE, a frequency point of the SR; step 520: scanning, by the UE, the frequency point to obtain a scan result; and/or step 530: connecting, by the UE, with the base station based on the scan result.

In some implementations, in response to the SS/PBCH block being placed at a first frequency, a first bandwidth comprises the SS/PBCH block in a frequency domain, wherein the first bandwidth is no smaller than the minimum bandwidth.

In various embodiments, the SS/PBCH block bandwidth may be smaller than the minimum bandwidth in narrowband scenarios. The UE determines the first frequency position through blind detection. When a SS/PBCH block is placed at the first frequency, the minimum bandwidth includes the SS/PBCH block in the frequency domain.

In some implementations, the basic scanning may be defined by the current specification. For example, each SR group has 3 SRs. The interval between the SRs is 100 kHz, and the interval between SRs with the same index in each group is 1200 kHz.

In various embodiments for the method 400 or the method 500, the method may further include determining, by the UE, the first frequency through a blind detection.

In some implementations, the method may further include performing, by the UE, an extended scanning in a frequency range of the narrowband.

In some other implementations, the frequency range comprises a range between 0 and 1 GHz, inclusive.

In some other implementations, the extended scanning comprises a higher density of SRs in frequency bands than a basic scanning.

In some other implementations, the extended scanning may include at least one or a combination of the methods described below.

In one method, the UE may determine a set of frequency positions in the frequency range as (N*b+M*c) kHz, wherein: N is an integer between 1 and n, inclusive; b is a frequency interval between SRs with same position in two adjacent SR groups; M comprises a list of {1, 3, . . . , 2m−1} with m being an integer larger than 4; and c is a frequency interval base for SRs in each SR group.

In some implementations, n represents a number of SR groups; and a value of n is determined based on the frequency range of the narrowband.

In some other implementations, m represents a number of SRs in each SR group; and a value of m is determined based on the minimum bandwidth.

In some other implementations, in response to the minimum bandwidth being smaller, the value of m is determined to be larger.

In some other implementations, a frequency interval between a first SR and a last SR in each SR group satisfies d=(2*m−2)*c.

In some other implementations, the frequency interval between the first SR and the last SR in each SR group is larger than 200 kHz.

In some other implementations, the set of frequency positions in the frequency range comprises (N*1200+M*50) kHz, wherein: the frequency range comprises a range between 0 and 1 GHz, inclusive; N is an integer between 1 and n, inclusive; and M comprises a list of {1, 3, 5, 7, 9}.

In some other implementations, compared with basic scanning, extended scanning may have a denser density of SRs in frequency bands. In an embodiment, the SR group contains a SRs within the narrowband frequency range, such as 0~1 GHz, and the value of a may be determined by the minimum bandwidth supported.

The number of SR groups is n, and the value of n may be determined by the narrowband frequency range. For example in one implementation, when the minimum bandwidth is smaller, n is bigger. In another implementation, n may be an integer in a range between 100 and 1000, inclusive. In another implementation, n may be 830.

The interval between SRs with the same M value in each group is b kHz, and the maximum value of M is 2m−1 (m>4). The UE determines the first offset M*c kHz according to M, and the value of c is determined by the narrowband. The interval between the first SR and the last SR in each group is (2m−2)×c=d kHz (d>200).

Optionally in some implementations, the interval between the SRs is e kHz, and the value of e may be determined by M and c.

According to the various embodiments described above, FIG. 6A may be one example pre-defined by the specification for extended scanning. FIG. 6B may be one example pre-defined by the specification for extended scanning when b=1200, c=50 and m=5.

In another method, the UE may determine a set of frequency positions in the frequency range as (N*b+M*c) kHz, wherein: N is an integer between 1 and n, inclusive; b is a frequency interval between SRs with same position in two adjacent SR groups; M comprises a list of {1, 5, . . . , 4m−3} with m being an integer larger than 2; and c is a frequency interval base for SRs in each SR group.

In some implementations, n represents a number of SR groups; and a value of n is determined based on the frequency range of the narrowband.

In some other implementations, m represents a number of SRs in each SR group; and a value of m is determined based on the minimum bandwidth.

In some other implementations, in response to the minimum bandwidth being smaller, the value of m is determined to be larger.

In some other implementations, a frequency interval between a first SR and a last SR in each SR group satisfies d=(4*m−3)*c.

In some other implementations, the frequency interval between the first SR and the last SR in each SR group is larger than 200 kHz.

In some other implementations, the set of frequency positions in the frequency range comprises (N*1200+M*50) kHz, wherein: the frequency range comprises a range between 0 and 1 GHz, inclusive; N is an integer between 1 and n, inclusive; and M comprises a list of {1, 5, 9}.

For another example, compared with basic scanning, extended scanning may have denser density of SRs in frequency bands. In some embodiments, the SR group contains a SRs within the narrowband frequency range, such as 0~1 GHz, and the value of a is determined by the minimum bandwidth supported. The number of SR groups is n, and the value of n is determined by the narrowband frequency range. The interval between SRs with the same M value in each group is b kHz, and the maximum value of M is 4m−3 (m>2). The UE determines the first offset M*c kHz according to M, and the value of c is determined by the narrowband. The interval between the first SR and the last SR in each group is (4m−4)×c=d kHz (d>200).

Optionally in other implementations, the interval between the SRs may be e kHz, and the value of e may be determined by M and c.

According to the various embodiments described above, FIG. 7A may be one example pre-defined by the specification for extended scanning. FIG. 7B may be one example pre-defined by the specification for extended scanning when b=1200, c=50 and m=3.

In another method, the UE may determine a set of frequency positions in the frequency range as (N*b+M*c−f) kHz, wherein: N is an integer between 1 and n, inclusive; b is a frequency interval between SRs with same position in two adjacent SR groups; M comprises a list of {1, 3, . . . , 2m−1} with m being an integer larger than 2; c is a frequency interval base for SRs in each SR group; and M*c is a first frequency offset; f is a second frequency offset; and M*c−f is a third frequency offset.

In some implementations, n represents a number of SR groups; and a value of n is determined based on the frequency range of the narrowband.

In some other implementations, m represents a number of SRs in each SR group; and a value of m is determined based on the minimum bandwidth.

In some other implementations, in response to the minimum bandwidth being smaller, the value of m is determined to be larger.

In some other implementations, a frequency interval between a first SR and a last SR in each SR group satisfies d=(2*m−2)*c.

In some other implementations, the frequency interval between the first SR and the last SR in each SR group is larger than 200 kHz.

In some other implementations, the set of frequency positions in the frequency range comprises (N*1200+ M*100−50) kHz, wherein: the frequency range comprises a range between 0 and 1 GHz, inclusive; N is an integer between 1 and n, inclusive; and M comprises a list of {1, 3, 5}.

For another example, compared with basic scanning, extended scanning may have denser density of SRs in frequency bands. In an embodiment, the SR group contains a SRs within the narrowband frequency range, such as 0~1 GHz, and the value of a is determined by the minimum bandwidth supported. The number of SR groups is n, and the value of n is determined by the narrowband frequency range. The interval between SRs with the same M value in each group is b kHz, and the maximum value of M is 2m−1 (m>2). The UE determines the third offset M*c−f kHz according to the first offset M*c kHz and the second offset f kHz., and the value of c is determined by the narrowband. The interval between the first SR and the last SR in each group is (2m−2)×c=d kHz (d>200).

Optionally in other implementations, the interval between the SRs is e kHz, and the value of e is determined by M and c.

According to the various embodiments described above, FIG. 8A may be one example pre-defined by the specification for extended scanning. FIG. 8B may be one example pre-defined by the specification for extended scanning when b=1200, c=100 and m=3.

In another method, the method 400 or 500 may further include determining a channel raster as the SR; and scanning, by the UE, each frequency position of the channel raster in the extended scanning. In some implementations, the frequency range comprises a range between 0 and 1 GHz, inclusive.

For another example, compared with basic scanning, extended scanning may have denser density of SRs in frequency bands. In an embodiment, the UE regards the channel raster as a SR, and scans each channel raster within the frequency range, such as 0~1 GHz, in the narrowband scenario.

In another method, the method 400 or 500 may further include determining a SR based on a boundary offset l; and scanning, by the UE, the SR at a frequency position l away from a system bandwidth boundary.

For another example, the boundary offset $$l = \frac{RB^{SS/PBCHblock}}{2}.$$

The offset starts from the first available RB in the low-frequency direction of the system bandwidth, and moves l RBs. The SR at a frequency position $$\frac{RB^{SS/PBCHblock}}{2}$$

away from a system bandwidth boundary of the low-frequency direction.

For another example, the boundary offset $$l = \frac{RB^{SS/PBCHblock}}{2}.$$

The offset starts from the first available RB in the high-frequency direction of the system bandwidth, and moves 1 RBs. The SR at a frequency position $$\frac{RB^{SS/PBCHblock}}{2}$$

away from a system bandwidth boundary of the low-frequency direction.

In another method, the method 400 or 500 may further include determining a SR based on a system bandwidth; and scanning, by the UE, the SR at a center frequency position of a system bandwidth.

For another example, the highest frequency of the system bandwidth is H and the lowest frequency is K, and the center of the system bandwidth is $$H - \left(\frac{H-K}{2}\right) \text{ or } K + \left(\frac{H-K}{2}\right),$$

which is the frequency position of the SR.

The various embodiments described in the present disclosure may address one or more the existing problems and improve the existing technology by at least one of the following benefits.

For one benefit, when the RB resource occupied by a SS/PBCH block is more than the maximum number of available RB resources among the minimum bandwidth, such as SS/PBCH block occupies 20 RBs and the minimum bandwidth is 3 MHz (the maximum number of available RB resources is 16), the various embodiments described in the present disclosure may ensure that the part of the SS/PBCH block exceeding the minimum bandwidth boundary is smaller than the first threshold, thus enhancing the reliability of receiving SS/PBCH block.

For another benefit, when SS/PBCH blocks occupy no more than the maximum number of available RB resources among the minimum bandwidth, such as SS/PBCH block occupies 20 RBs and the minimum bandwidth is 3 MHz (the maximum number of available RB resources is 16), the various embodiments described in the present disclosure may ensure that there is at least one frequency position where the SS/PBCH block bandwidth is included in the minimum bandwidth. This enhances the reliability of receiving SS/PBCH block.

For another benefit, in some embodiments described in the present disclosure, each SR group contains 3 SRs, which is same as the current working mechanism. Therefore, the total number of global synchronization channel number (GSCN) may not increase. This reduces the modification to specification in narrowband scenarios.

For another benefit, one or more embodiment described in the present disclosure may ensure that when the RBs contained in the SSB is close to the number of RBs contained in the supported minimum bandwidth, at least one frequency position in the minimum bandwidth can ensure that the part of the SS/PBCH block exceeding the minimum bandwidth boundary is smaller than the first threshold.

In various embodiments, the PBCH mapping sequence may be determined in a narrowband scenario where the frequency band is less than 5 MHz.

In a narrowband scenario, the minimum bandwidth supported is less than 5 MHz and the frequency point does not exceed 3 GHz. For example, in a narrowband scenario, 3.6 MHz or/and 3 MHz is supported in the 0~1 GHz frequency range.

In an embodiment, the UE determines the frequency position through blind detection. When a SS/PBCH block is placed at the frequency position and the available bandwidth may not completely include the SS/PBCH block in the frequency domain, the UE may stop receiving signals from the gNB on RBs that exceeds the available bandwidth, or the gNB may not send signals in the RBs that exceeds the available bandwidth to the UE. This may mean that when the UE receives only one SS/PBCH block, it may not completely decode all PBCH REs.

In various embodiments, at least one of the following methods may be used for PBCH mapping.

In one method, the method 400 or 500 may further include mapping, by the base station, a first PBCH resource element (RE) onto a first frequency domain; and mapping, by the base station, a second PBCH RE onto a second frequency domain, wherein the first frequency domain is different from the second frequency domain.

In some implementations, the first PBCH RE comprises more important information than the second PBCH RE; and the first frequency domain is more at center of the SS/PBCH block than the second frequency domain.

In some other implementations, the first PBCH RE is mapped onto the first frequency domain corresponding to a primary synchronization signal or a secondary synchronization signal (PSS/SSS).

In some other implementations, the second PBCH RE is mapped onto the second frequency domain that does not correspond to a primary synchronization signal or a secondary synchronization (PSS/SSS).

One example may first map the PBCH RE of a specific frequency domain, and then map the PBCH RE of other frequency domains. For example, map the PBCH RE within the bandwidth corresponding to the PSS/SSS first, and then map the PBCH RE beyond the bandwidth corresponding to the PSS/SSS.

The above described method may address one or more the existing problems and improve the existing technology by at least one of the following benefits. For one benefit, the method may ensure the reliability of more important information. The information carried by the interrupted RE is information with lower reliability requirements or lower priorities.

In another method, the method 400 or 500 may further include mapping, by the base station, a PBCH resource element (RE) with at least 2 different mapping sequence in at least 2 repetition period within a PBCH change period.

In another example, in different repetition periods within the PBCH change period, PBCH RE is mapped in different mapping sequence. For example, within aa milliseconds, the PBCH information carried by two SS/PBCH blocks is same. In this case, the mapping sequence for the PBCH RE of the two SSBs is different. In the first SS/PBCH block, PBCH RE is mapped from low frequency point to high frequency point, while in the second SS/PBCH block, PBCH RE is mapped from high frequency point to low frequency point. The mapping sequence is not limited to the above two types.

The above described method may address one or more the existing problems and improve the existing technology by at least one of the following benefits. For one benefit, the method may ensure that the UE can receive a more complete PBCH RE when receiving different SSBs.

The present disclosure describes various embodiment for determining the set of resource blocks and slot symbols of CORESET for Type0-PDCCH search space set when {SS/PBCH block, PDCCH} SCS is {15, 15} kHz for frequency bands with minimum channel bandwidth 3 MHz.

In some embodiments, a UE may determine the set of resource blocks and slot symbols of CORESET for Type0-PDCCH search space set when {SS/PBCH block, PDCCH} SCS is {15, 15} kHz for frequency bands with minimum channel bandwidth 3 MHz according to one or more example in FIGS. 9A, 9B, and/or 9C which may be predefined.

The above described method may address one or more the existing problems and improve the existing technology by at least one of the following benefits. For one benefit, the CORESET0 may support bandwidth less than 5 MHz.

The present disclosure describes various embodiment for supporting, by a UE, a first multiplexing capability and a second multiplexing capability. The first multiplexing capability preferentially multiplexes the channels/signals of the same priority, and in case of conflict between channels/signals of different priorities, drop low-priority (LP) channel/signal. The second multiplexing capability allows channels with different priorities to be multiplexed. Potential channels/signals transmitted by the UE include at least one of the following: high-priority (HP) PUSCH, LP PUSCH, high-priority HARQ-ACK, LP HARQ-ACK, HP UCI, and LP UCI. Channels/Signals multiplexing case includes at least one of the following: Multiplexing HARQ-ACK/UCI on the PUSCH with same priority; Multiplexing HARQ-ACK/UCI on the PUSCH with different priority; Multiplexing LP HARQ-ACK/UCI on LP PUSCH; Multiplexing HP HARQ-ACK/UCI on HP PUSCH; Multiplexing LP HARQ-ACK/UCI on HP PUSCH; Multiplexing HP HARQ-ACK/UCI on LP PUSCH; Multiplexing LP HARQ-ACK/UCI on different priority PUSCH; Multiplexing HP HARQ-ACK/UCI on different priority PUSCH.

In various embodiments, at least one of the following methods may be used for the UE supporting the first multiplexing capability and the second multiplexing capability to process channel/signal conflicts.

For one method, the UE may determine the processing sequence of multiplexing case in the way which may be predefined. For example, Multiplexing HARQ-ACK/UCI on the PUSCH with same priority is processed first, and Multiplexing HARQ-ACK/UCI on the PUSCH with different priority is then processed. For another example, Multiplexing HP HARQ-ACK/UCI on LP PUSCH is processed first, then Multiplexing HARQ-ACK/UCI on the PUSCH with same priority is processed, and finally Multiplexing LP HARQ-ACK/UCI on HP PUSCH is processed.

For another method, a parameter may be indicated to the UE through RRC signalling or downlink control information (DCI). The UE determines whether the HP PUSCH can multiplex other signals/channels according to this parameter. For an example, the parameter contains one bit. When the value is 1, the HP PUSCH can multiplex other signals/channels; when the value is 0, the HP PUSCH cannot multiplex other signals/channels. If the value of the parameter is 0, Multiplexing LP HARQ-ACK/UCI on LP PUSCH is processed first, then Multiplexing HP HARQ-ACK/UCI on LP PUSCH is processed. Or, Multiplexing HP HARQ-ACK/UCI on LP PUSCH is processed first, then Multiplexing LP HARQ-ACK/UCI on LP PUSCH is processed. If the value of the parameter is 1, Multiplexing HARQ-ACK/UCI on the PUSCH with same priority is processed first, and Multiplexing HARQ-ACK/UCI on the PUSCH with different priority is then processed. Or, Multiplexing HP HARQ-ACK/UCI on LP PUSCH is processed first, then Multiplexing HARQ-ACK/UCI on the PUSCH with same priority is processed, and finally Multiplexing LP HARQ-ACK/UCI on HP PUSCH is processed.

For another method, a parameter may be indicated to the UE through RRC signalling or DCI. The UE determines whether the HP PUSCH can multiplex LP signals/channels according to this parameter. For an example, the parameter contains one bit. When the value is 1, the HP PUSCH can multiplex LP signals/channels; when the value is 0, the HP PUSCH cannot multiplex other signals/channels. If the value of the parameter is 0, Multiplexing HARQ-ACK/UCI on the PUSCH with same priority is processed first, then Multiplexing HP HARQ-ACK/UCI on LP PUSCH is processed. Or, Multiplexing HP HARQ-ACK/UCI on LP PUSCH is processed first, then Multiplexing HARQ-ACK/UCI on the PUSCH with same priority is processed. If the value of the parameter is 1, Multiplexing HARQ-ACK/UCI on the PUSCH with same priority is processed first, and Multiplexing HARQ-ACK/UCI on the PUSCH with different priority is then processed. Or, Multiplexing HP HARQ-ACK/UCI on LP PUSCH is processed first, then Multiplexing HARQ-ACK/UCI on the PUSCH with same priority is processed, and finally Multiplexing LP HARQ-ACK/UCI on HP PUSCH is processed.

The present disclosure describes methods, apparatus, and computer-readable medium for wireless communication. The present disclosure addressed the issues with determining sync raster. The methods, devices, and computer-readable medium described in the present disclosure may facilitate the performance of wireless transmission between a user equipment and a base station, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

What is claimed is:

1. A method for wireless communication, comprising:
determining, by a user equipment, UE, a synchronization raster, SR, wherein a frequency position of the SR is specified in a predefined table, and wherein a minimum bandwidth supported by the UE is less than 5 MHz in a frequency range of 0-1 GHZ;
referencing the frequency position of the SR by the UE to detect a synchronization signal/physical broadcast channel, SS/PBCH, block transmitted by a base station by performing a scan of a plurality of SRs for the SS/PBCH at the frequency position through a blind detection; and in response to a bandwidth of the SS/PBCH block being larger than the minimum bandwidth and that at least one resource block, RB, in the SS/PBCH block exceeding the minimum bandwidth, not receiving by the UE the at least one RB when detecting the SS/PBCH block, wherein the frequency position in the frequency range is determined by (N*b+M*c−f) kHz, and wherein:

N is an integer between 1 and n, inclusive, for indicting SR groups;

M represents SRs within each SR group and comprises a list of $\{1, 3, \ldots, 2m{-}1\}$ with m being an integer larger than 2;

b is a frequency interval between two adjacent SR groups;

c is a frequency interval base for SRs in each SR group; and f represents a frequency offset.

2. The method according to claim 1, wherein the SS/PBCH block is received at the frequency position in response to a first number of RBs being smaller than or equal to a first threshold, the first number of RBs being $\lceil RB^{SS/PBCHblock} - RB^{BWP_{min}}\rceil$, wherein:

BWP denotes a narrow band;

$RB^{SS/PBCHblock}$ represents a number of RBs that the SS/PBCH block occupies in frequency;

$RB^{BWP_{min}}$ represents a number of RBs within the minimum bandwidth; and $\lceil \ldots \rceil$ represents a ceiling function.

3. The method according to claim 1, wherein the blind detection comprises an extended scanning of the frequency range in a narrowband.

4. The method according to claim 3, wherein the extended scanning involves a higher density of SRs in the frequency range than a basic scanning.

5. The method according to claim 1, wherein:

n represents a number of the SR groups, and a value of n is determined based on the frequency range of the narrowband; and/or m represents a number of SRs in each SR group, and a value of m is determined based on the minimum bandwidth.

6. The method according to claim 3, wherein the blind detection comprises:

determining, by the UE, a channel raster; and scanning, by the UE, each frequency position of the channel raster in the extended scanning.

7. A user equipment (UE) in a wireless communications network comprising at least one processor and a memory, wherein the at least one processor is configured to read code from the memory to:

determine a synchronization raster, SR, wherein a frequency position of the SR is specified in a predefined table, and wherein a minimum bandwidth supported by the UE is less than 5 MHz in a frequency range of 0-1 GHz;

reference the frequency position of the SR to detect a synchronization signal/physical broadcast channel, SS/PBCH, block transmitted by a base station by performing a scan of a plurality of SRs for the SS/PBCH at the frequency position through a blind detection; and in response to a bandwidth of the SS/PBCH block being larger than the minimum bandwidth and that at least one resource block, RB, in the SS/PBCH block exceeding the minimum bandwidth, not receive by the UE the at least one RB when detecting the SS/PBCH block, wherein the frequency position in the frequency range is determined by (N*b+M*c−f) kHz, and wherein:

N is an integer between 1 and n, inclusive, for indicting SR groups;

M represents SRs within each SR group and comprises a list of $\{1, 3 \ldots 2m{-}1\}$ with m being an integer larger than 2;

b is a frequency interval between two adjacent SR groups; and c is a frequency interval base for SRs in each SR group; and f represents a frequency offset.

8. The UE according to claim 7, wherein the SS/PBCH block is received at the frequency position in response to a first number of RBs being smaller than or equal to a first threshold, the first number of RBs being $\lceil RB^{SS/PBCHblock} - RB^{BWP_{min}}\rceil$, wherein:

BWP denotes a narrow band;

$RB^{SS/PBCHblock}$ represents a number of RBs that the SS/PBCH block occupies in frequency;

$RB^{BWP_{min}}$ represents a number of RBs within the minimum bandwidth; and $\lceil \ldots \rceil$ represents a ceiling function.

9. The UE according to claim 8, wherein the blind detection comprises an extended scanning of the frequency range in a narrowband involving a higher density of SRs in the frequency range than a basic scanning.

10. The UE according to claim 7, wherein:

n represents a number of the SR groups, and a value of n is determined based on the frequency range of the narrowband; and/or m represents a number of SRs in each SR group, and a value of m is determined based on the minimum bandwidth.

11. A non-transitory computer-readable storage medium for storing instructions, the instructions, when executed by at least one processor of a user equipment (UE) in a wireless communications network, are configured to:

determine a synchronization raster, SR, wherein a frequency position of the SR is specified in a predefined table, and wherein a minimum bandwidth supported by the UE is less than 5 MHz in a frequency range of 0-1 GHz;

reference the frequency position of the SR to detect a synchronization signal/physical broadcast channel, SS/PBCH, block transmitted by a base station by performing a scan of a plurality of SRs for the SS/PBCH at the frequency position through a blind detection; and in response to a bandwidth of the SS/PBCH block being larger than the minimum bandwidth and that at least one resource block, RB, in the SS/PBCH block exceeding the minimum bandwidth, not receive by the UE the at least one RB when detecting the SS/PBCH block, wherein the frequency position in the frequency range is determined by (N*b+M*c−f) kHz, and wherein:

N is an integer between 1 and n, inclusive, for indicting SR groups;

M represents SRs within each SR group and comprises a list of $\{1, 3 \ldots 2m{-}1\}$ with m being an integer larger than 2;

b is a frequency interval between two adjacent SR groups; and c is a frequency interval base for SRs in each SR group; and f represents a frequency offset.

* * * * *